United States Patent
Ruschman et al.

(10) Patent No.: US 11,572,108 B2
(45) Date of Patent: Feb. 7, 2023

(54) ACTIVE INTEGRATED DEFLECTOR

(71) Applicant: GM Global Technology Operations LLC, Detroit, MI (US)

(72) Inventors: Joel P. Ruschman, Beverly Hills, MI (US); David T. Renke, Macomb, MI (US); Joseph M. Polewarczyk, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 943 days.

(21) Appl. No.: 16/409,039

(22) Filed: May 10, 2019

(65) Prior Publication Data

US 2020/0353997 A1 Nov. 12, 2020

(51) Int. Cl.
 *B62D 35/00* (2006.01)
 *B60D 1/24* (2006.01)

(52) U.S. Cl.
 CPC ............ *B62D 35/007* (2013.01); *B60D 1/248* (2013.01); *B60Y 2200/147* (2013.01)

(58) Field of Classification Search
 CPC ...... B62D 35/007; B62D 37/02; B60D 1/248; B60Y 2200/147; Y02T 10/82
 See application file for complete search history.

(56) References Cited

U.S. PATENT DOCUMENTS

| | | | | | |
|---|---|---|---|---|---|
| 4,810,022 | A * | 3/1989 | Takagi | ................. | B62D 35/005 296/180.5 |
| 4,854,635 | A * | 8/1989 | Durm | ................... | B62D 35/007 296/180.1 |
| 6,193,302 | B1 * | 2/2001 | Won | ....................... | B62D 37/02 296/180.1 |
| 10,035,549 | B2 * | 7/2018 | Morgan | ............... | B62D 35/007 |
| 2013/0080078 | A1 * | 3/2013 | Wirthlin | .................. | G01L 5/136 702/41 |
| 2015/0274223 | A1 * | 10/2015 | Wolf | ....................... | B62D 37/02 296/180.5 |
| 2017/0080987 | A1 * | 3/2017 | Morgan | ............... | B62D 35/005 |
| 2018/0039266 | A1 * | 2/2018 | Dotzler | ............. | G01C 21/3415 |
| 2018/0072118 | A1 * | 3/2018 | Dudar | ....................... | B60D 1/62 |
| 2019/0344837 | A1 * | 11/2019 | Toki | ..................... | B62D 35/001 |
| 2020/0102009 | A1 * | 4/2020 | Owen | .................. | B62D 15/028 |
| 2020/0108877 | A1 * | 4/2020 | Prabhakar | ................ | B60Q 1/30 |
| 2020/0317212 | A1 * | 10/2020 | Rogness | ............... | B60W 40/13 |

FOREIGN PATENT DOCUMENTS

DE 10207040 A1 * 8/2003 ........... B62D 35/007
DE 102019216686 A1 * 5/2021 ........... B62D 35/007

\* cited by examiner

*Primary Examiner* — Lori L Lyjak
(74) *Attorney, Agent, or Firm* — Quinn IP Law

(57) ABSTRACT

A method for controlling a vehicle includes providing a first vehicle having a deflection system, a control system includes a controller electronically connected to the deflection system, and a first tow connection, the deflection system including a movable deflection member and at least one actuator coupled to the deflection member, providing a second vehicle coupled to the first vehicle, the second vehicle having a second tow connection, providing at least one sensor coupled to the first vehicle and electronically connected to the control system, the at least one sensor configured to capture data corresponding to a frontal area of the second vehicle, monitoring, by the controller, sensor data received from the at least one sensor, and automatically generating, by the controller, a control signal to control the at least one actuator.

17 Claims, 3 Drawing Sheets

ACTIVE INTEGRATED DEFLECTOR

INTRODUCTION

The present disclosure relates generally to an air deflector for vehicles that shields a trailer from airflow impingement.

Sport utility and "crossover" vehicles are commonly used for towing operations. The towed vehicle, such as a trailer, is often not optimized for fuel economy, as the towed vehicle often includes a large frontal area surface and sharp corners that create excess drag on the tow vehicle.

SUMMARY

Embodiments according to the present disclosure provide a number of advantages. For example, embodiments according to the present disclosure reduce overall drag created by the towed vehicle by deflecting the air that would normal impinge on the frontal surface of the towed vehicle. The position of the deflector is dependent on various characteristics of the towing vehicle and may be determined computationally or via physical testing.

A method for controlling a vehicle according to the present disclosure includes providing a first vehicle having a deflection system, a control system including a controller electronically connected to the deflection system, and a first tow connection. The deflection system includes a movable deflection member and at least one actuator coupled to the deflection member. The method further includes providing a second vehicle coupled to the first vehicle, the second vehicle having a second tow connection. The method also includes providing at least one sensor coupled to the first vehicle and electronically connected to the control system, the at least one sensor configured to capture data corresponding to a frontal area of the second vehicle. The method additionally includes monitoring, by the controller, sensor data received from the at least one sensor and automatically generating, by the controller, a control signal to control the at least one actuator.

In exemplary embodiments, the at least one actuator is configured to move the deflection member between a first position and a second position.

In exemplary embodiments, the first position is a stowed position and the second position is a deployed position.

In exemplary embodiments, the method further includes determining, by the controller, whether a first condition is satisfied, the first condition including detecting an electronic connection between the first tow connection and the second tow connection.

In exemplary embodiments, if the first condition is satisfied, the method further includes automatically generating the control signal to control the at least one actuator to move the deflection member between a first position and second position, wherein the first position is a stowed position and the second position is a deployed position.

In exemplary embodiments, the at least one sensor comprises a first sensor configured to capture image data corresponding to the frontal area of the second vehicle and a second sensor configured to determine a distance between the first vehicle and the second vehicle, and the method further comprises determining, by the controller, an initial deployment angle of the deflection member and an initial hitch load based on the frontal area of the second vehicle and the distance between the first vehicle and the second vehicle.

In exemplary embodiments, the method further includes determining, by the controller, a first adjusted deployment angle of the deflection member and a corresponding first hitch load and a second adjusted deployment angle of the deflection member and a corresponding second hitch load and comparing, by the controller, the initial hitch load, the first hitch load and the second hitch load to determine an optimal deployment angle of the deflection member.

An automotive vehicle according to the present disclosure includes a body having a roof, the roof including a recessed surface, and a deflection system including a movable deflection member coupled to the roof and movable from a first position adjacent to the recessed surface of the body and a second position. The automotive vehicle also includes at least one actuator coupled to the deflection member and at least one sensor, the at least one sensor configured to capture data on an environment surrounding the automotive vehicle. The automotive vehicle also includes at least one controller in communication with the at least one actuator and the at least one sensor, the at least one controller configured to, in response to satisfaction of a first condition, control the at least one actuator to move the deflection member between the first position and the second position.

In exemplary embodiments, the first position is a stowed position and the second position is a deployed position.

In exemplary embodiments, the controller is further configured to determine a deployment angle of the deflection member and automatically generate a control signal to control the at least one actuator to move the deflection member between a stowed position and a deployed position, wherein the deployed position is based on the deployment angle.

In exemplary embodiments, the first condition is satisfied when the automotive vehicle is connected to a towed vehicle and, if the first condition is satisfied, the controller is further configured to automatically generate a control signal to control the at least one actuator to move the deflection member between the first position and the second position, wherein the first position is a stowed position and the second position is a deployed position.

In exemplary embodiments, the controller is further configured to determine a size of a frontal area of the towed vehicle.

In exemplary embodiments, the at least one sensor comprises a first sensor configured to capture image data corresponding to the frontal area of the towed vehicle and a second sensor configured to determine a distance between the automotive vehicle and the towed vehicle, and the controller is further configured to determine an initial deployment angle of the deflection member and an initial hitch load based on the frontal area of the towed vehicle and the distance between the automotive vehicle and the towed vehicle.

In exemplary embodiments, the controller is further configured to determine a first adjusted deployment angle of the deflection member and a corresponding first hitch load and a second adjusted deployment angle of the deflection member and a corresponding second hitch load and comparing, by the controller, the initial hitch load, the first hitch load and the second hitch load to determine an optimal deployment angle of the deflection member.

A system for controlling a first vehicle coupled to a towed vehicle according to the present disclosure includes a deflection system including a movable deflection member coupled to the first vehicle, at least one actuator coupled to the deflection member, a first sensor configured to capture image data corresponding to a frontal area of the towed vehicle and a second sensor configured to determine a distance between the first vehicle and the towed vehicle. The system also includes a controller electronically connected to the at least one actuator and the at least one sensor. The controller is configured to monitor sensor data received from the first sensor and the second sensor, determine an initial deployment angle of the deflection member and an initial hitch load based on the frontal area of the towed vehicle and the distance between the first vehicle and the towed vehicle, and automatically generate a control signal to control the at least one actuator to move the deflection member between a first position and a second position.

In exemplary embodiments, the first vehicle includes a roof including a recessed surface, the first position is a stowed position in which the deflection member is adjacent to the recessed surface, and the second position is a deployed position corresponding to the initial deployment angle.

In exemplary embodiments, the controller is further configured to determine whether a first condition is satisfied, the first condition being satisfied when the first vehicle is connected to the towed vehicle, and if the first condition is satisfied, the controller is further configured to automatically generate the control signal to control the at least one actuator to move the deflection member between the first position and the second position, wherein the first position is a stowed position and the second position is a deployed position.

In exemplary embodiments, the controller is further configured to determine a first adjusted deployment angle of the deflection member and a corresponding first hitch load and a second adjusted deployment angle of the deflection member and a corresponding second hitch load and compare the initial hitch load, the first hitch load and the second hitch load to determine an optimal deployment angle of the deflection member.

In exemplary embodiments, the controller is further configured to determine the initial deployment angle of the deflection member from the frontal area of the towed vehicle, automatically generate a first control signal to control the at least one actuator to move the deflection member to an initial deployed position based on the initial deployment angle, and automatically generate a second control signal to control the at least one actuator to move the deflection to an optimal deployed position based on the optimal deployment angle.

BRIEF DESCRIPTION OF THE DRAWINGS

The present disclosure will be described in conjunction with the following figures, wherein like numerals denote like elements.

Figure 1:
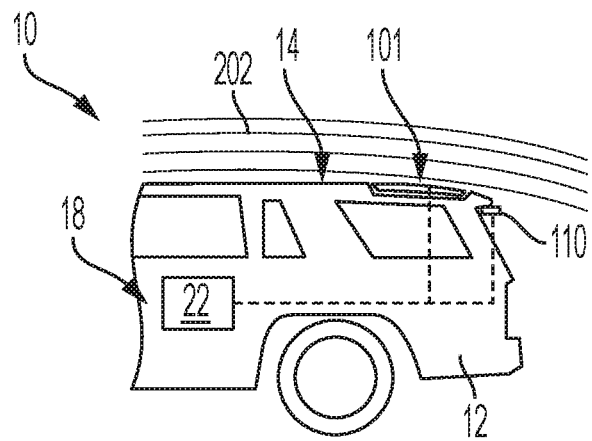
FIG. 1 is a schematic diagram of a vehicle having a deflector in a stowed position, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Towing vehicles may include an active, integrated deflector that shields a trailer or towed vehicle from airflow impingement, thus reducing drag on the trailer and improving the fuel economy of the towing vehicle. In various embodiments, the deflector position may be determined using a rearview camera & control system that is activated when the operator electronically attaches the towed vehicle or trailer to the towing vehicle.

Figure 2:
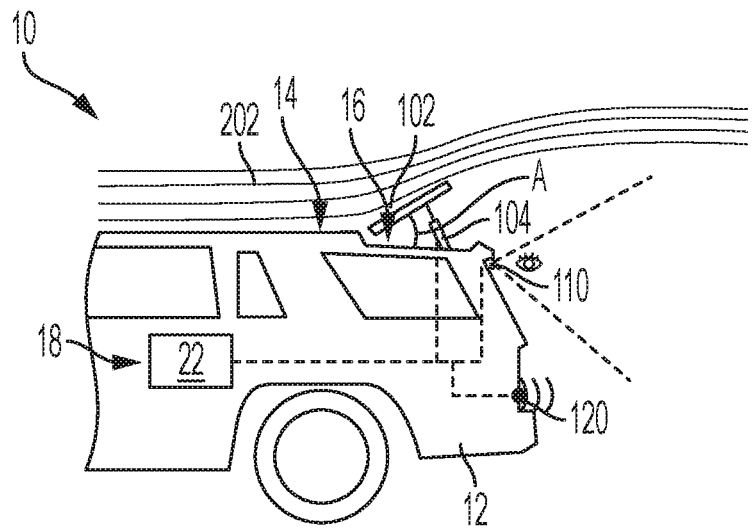
FIG. 2 is a schematic diagram of a vehicle having a deflector in a deployed position, according to an embodiment.

With reference to FIGS. 1 and 2, a vehicle 10 is shown that includes a deflection system 101 including a movable deflection member 102. As can be appreciated, the vehicle 10 may be any one of a number of different types of automobiles, such as, for example, a sedan, a wagon, a truck, or a sport utility vehicle (SUV), or any other vehicle configured to tow a trailer or other towable vehicle.

The vehicle 10 generally includes a vehicle body 12 arranged on a chassis (not shown). The vehicle body 12 substantially encloses the other components of the vehicle 10, including a control system 18. The vehicle body 12 further includes a vehicle roof 14. In various embodiments, the vehicle roof 14 includes a recessed surface 16. As discussed in greater detail, the deflection member 102 is coupled to the roof and movable between a first position and a second position and multiple positions between the first and second positions. In various embodiments, the first position is a stowed position and the second position is a deployed position. In the first or stowed position, the deflection member 102 is adjacent to the recessed surface 16.

The control system 18 includes a controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

In some embodiments, the vehicle 10 includes one or more sensors electronically connected to the controller 22 and configured to measure and capture data on one or more vehicle or environmental characteristics, including but not limited to an image of the environment surrounding the vehicle 10, a distance between the towed vehicle and the tow vehicle, a hitch load or tongue weight of the towed vehicle, an indicator of the drag force, and a vehicle speed. In various embodiments, the deflection system 101 of the vehicle 10 includes one or more sensors 110 configured to capture image data of an area behind the vehicle 10. The sensor 110 is electronically connected to the controller 22 of the control system 18 and provides data on the vehicle environment. In the illustrated embodiment, the sensor 110 may include RADAR, LIDAR, optical cameras, thermal cameras, ultrasonic sensors, infrared sensors, and/or additional sensors as appropriate. In some embodiments, the sensor 110 is a rearview camera.

In various embodiments, the deflection system 101 of the vehicle 10 includes one or more sensors 120 configured to capture data on an environment behind the vehicle 10, including detecting an object behind the vehicle 10. In various embodiments, the sensor 120 is a rear object detection sensor. The sensor 120 is electronically connected to the controller 22 of the control system 18 and provides data on the rear environment of the vehicle 10. In the illustrated embodiment, the sensor 120 may include RADAR, LIDAR, optical cameras, thermal cameras, ultrasonic sensors, infrared sensors, and/or additional sensors as appropriate.

In various embodiments, the vehicle 10 includes one or more actuators configured to control components of the vehicle 10. In some embodiments, the deflection system 101 includes at least one more or actuator 104 that is coupled to the deflection member 102, as shown in FIG. 2. The actuator 104 may comprise an electric motor, an accumulator, other suitable actuator type, or any combination thereof. In some embodiments, the actuator 104 applies force to the deflection member 102 to move the deflection member 102 between the first and second positions. In some embodiments, one or more actuators 104 can be coupled to the deflection member 102. The one or more actuators 104 is in electronic communication with the controller 22. As discussed herein, operation of the one or more actuators 104 can be monitored and controlled by the control system 18 to determine an optimal position of the deflection member 102.

The control system 18 receives the sensor signals and monitors and/or controls operation of the deflection system 101 based thereon. In general, the control system 18 receives the sensor signals, and processes the sensor signals to detect a towed vehicle or trailer, determine an approximate height and size of a frontal area of the towed vehicle or trailer, determine an approximate weight of the towed vehicle, determine a distance between the towed vehicle and the tow vehicle, determine an initial deployment angle of the deflection member 102, iteratively adjust the deployment angle of the deflection member 102, and control the actuator 104 to deploy the deflection member 102 to a height and angle appropriate to the size and weight of the trailer or towed vehicle and the distance between the towed vehicle and the tow vehicle.

Figure 3:
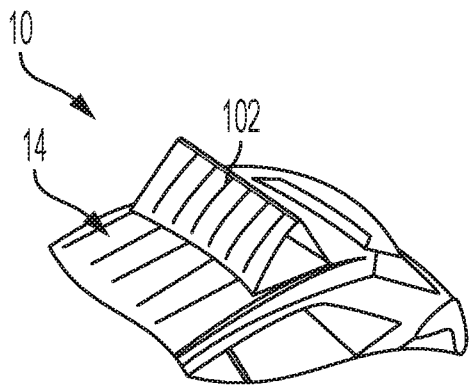
FIG. 3 is a schematic top perspective diagram of a vehicle having a deflector, according to an embodiment.

As shown in FIGS. 1-3, the deflection member 102 is movable between the stowed position (shown in FIG. 1) and the deployed position (shown in FIGS. 2 and 3). In the deployed position, the deflection member 102 defines a deployment angle A with the recessed surface 16 of the vehicle roof 14, as shown in FIG. 2. In various embodiments, the angle A may be an initial deflection angle determined from a look up table and may be iteratively adjusted based on a hitch load applied by the towed vehicle, the speed at which the towing operation is conducted, etc., for example and without limitation. The controller 22 determines the angle A from data received from the sensor 110 regarding the frontal height of the towed vehicle such that airflow, depicted as the lines 202, is redirected over the top of the towed vehicle to improve the aerodynamics of the vehicle 10 while performing a towing operation. When the vehicle 10 is not performing a towing operation, the controller 22 controls the actuator 104 to position the deflection member 102 to the stowed position adjacent to the recessed surface 16 such that the vehicle roof 14 is a substantially level surface, as shown in FIG. 1.

Figure 4:
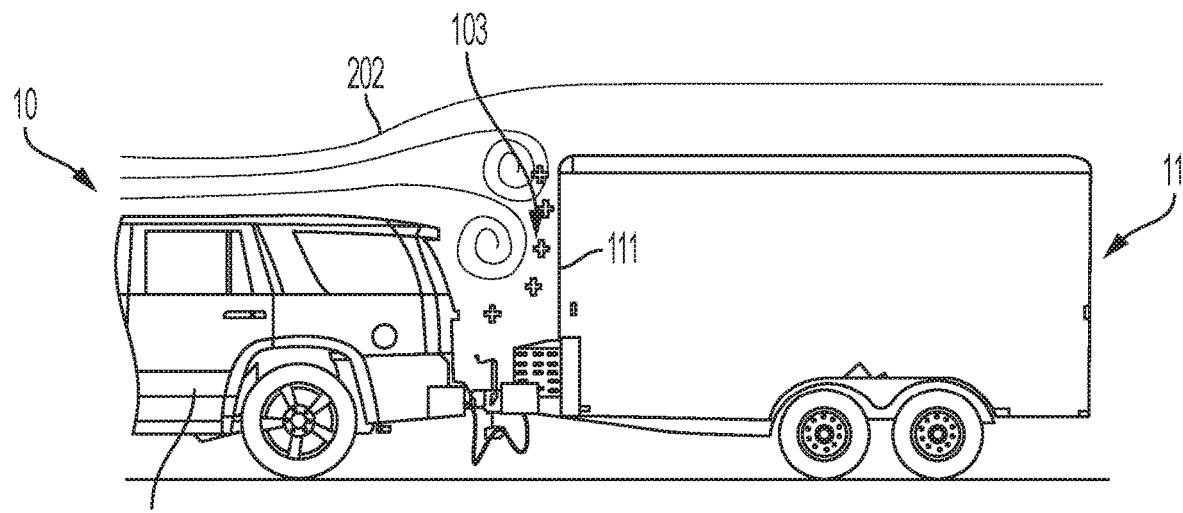
FIG. 4 is a schematic diagram of a tow vehicle and trailer with the deflector disengaged, according to an embodiment.
Figure 5:
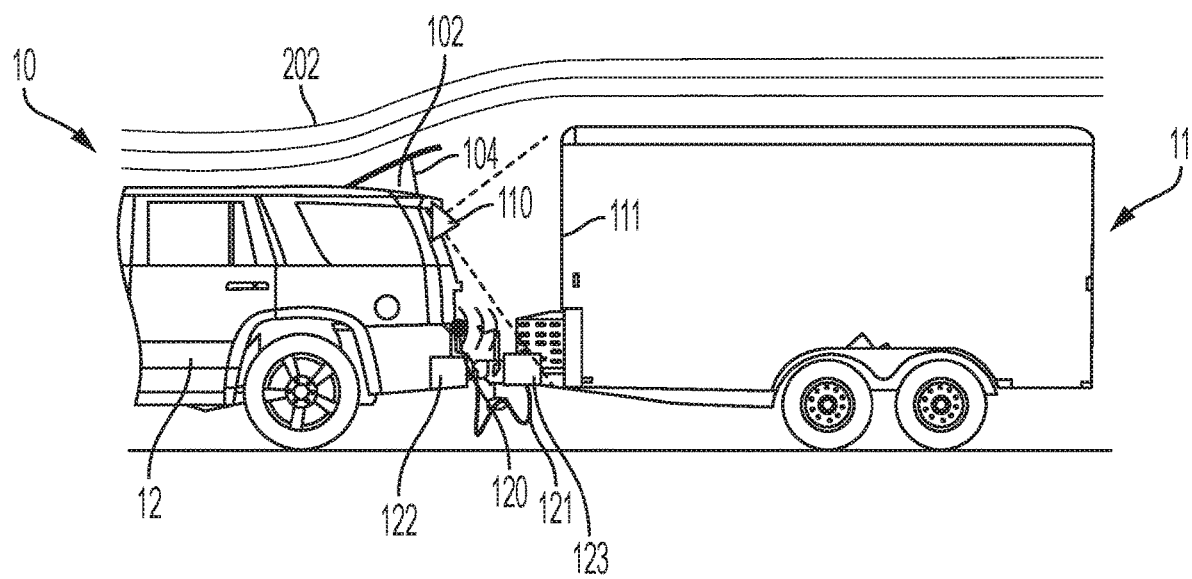
FIG. 5 is a schematic diagram of a tow vehicle and trailer with the deflector engaged, according to an embodiment.

FIGS. 4 and 5 illustrate the tow vehicle 10 connected to a towed vehicle 11, according to an embodiment. The towed vehicle 11 has a frontal area 111 facing the rear end of the tow vehicle 10. For various towing operations, such as the one shown in FIGS. 4 and 5, the towed vehicle 11 includes a blunt frontal area with sharp corners such that the towed vehicle is not aerodynamically optimized.

As shown in FIG. 4, the tow vehicle 10 does not necessarily have a deployed deflection member 102. The airflow 202 is not directed over and around the front of the towed vehicle 11. The airflow 202 passes over the tow vehicle 10 and impinges on the frontal area 111 of the towed vehicle 11, forming a high-pressure zone 103. The high-pressure zone 103 results in increased drag on the tow vehicle 10, leading to reduced fuel economy.

With reference to FIG. 5, the sensor 110 captures data that includes the frontal area 111 of the towed vehicle 11. The sensor 120 additionally captures data regarding the towed vehicle, including a distance between the front of the towed vehicle 11 and the back of the tow vehicle 10. In various embodiments, the towed vehicle 11 is electronically coupled, as well as physically coupled, to the tow vehicle 10. In some embodiments, a cable 121 electronically couples the tow vehicle 10 and the towed vehicle 11. Connection of the cable 121 between a first or tow vehicle connection 122 and a second or towed vehicle connection 123 establishes a physical and/or electronic connection between the tow vehicle 10 and the towed vehicle 11, such as, for example and without limitation, a connection to provide power and illuminate brake and/or turn lights on the towed vehicle 11 via an existing vehicle tow plug connection. The controller 22 receives information regarding the electronic connection between the tow vehicle 10 and towed vehicle 11 when the connection is established. Based on this condition, the controller 22 directs the sensors 110, 120 to capture data regarding the towed vehicle 11 and generate a control signal to control the actuator 104 to deploy the deflection member 102 to the deployed position or positions. While the connection between the tow vehicle 10 and the towed vehicle 11 is illustrated as a physical connection, in various embodiments, an electronic connection between the tow vehicle 10 and the towed vehicle 11 may be established wired or wirelessly.

Figure 6:
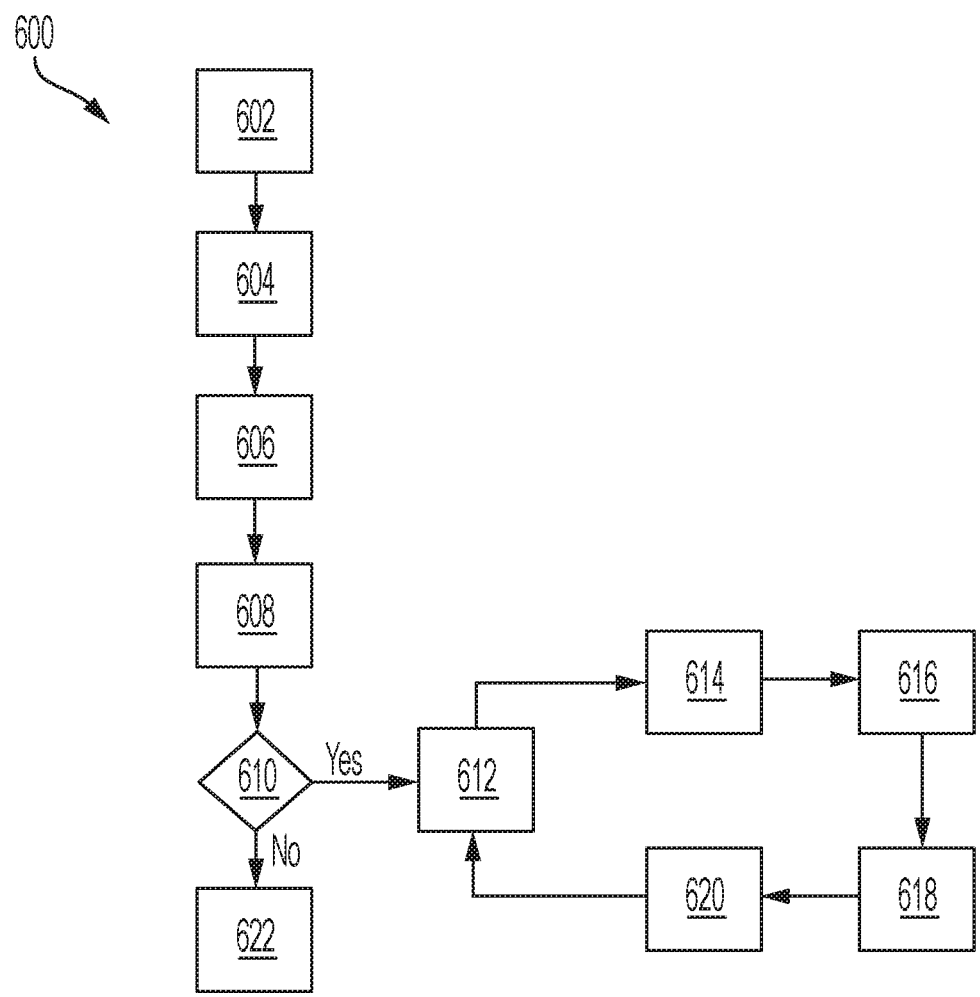
FIG. 6 is a flowchart representation of a method of controlling a vehicle, according to an embodiment.

FIG. 6 illustrates a method 600 of controlling an automotive vehicle illustrated in flowchart form. The method 600 can be utilized in connection with the tow vehicle 10 and the control system 18, including the controller 22 or by other systems associated with or separate from the vehicle, in accordance with exemplary embodiments. The order of operation of the method 600 is not limited to the sequential execution illustrated in FIG. 6, but may be performed in one or more varying orders, or steps may be performed simultaneously, as applicable in accordance with the present disclosure.

The method 600 begins at 602 when a trigger or first condition is detected. The trigger condition is, in some embodiments, receipt by the controller 22 of data indicating a towed vehicle has been electronically connected to the tow vehicle. Next, at 604, the controller activates the sensors 110, 120 to capture data regarding the frontal area of the towed vehicle, the distance between the tow vehicle and the towed vehicle, a hitch load of the towed vehicle, etc., for example and without limitation. In various embodiments, the data includes image data.

At 606, the controller 22 analyzes the sensor data to determine the frontal area of the towed vehicle 11 and the initial hitch load $N_i$. The analysis of the sensor data includes determining the deflection angle A of the deflection member 102 to establish an initial deployed position. In various embodiments, the deflection angle A is an initial deflection angle that is determined from a lookup table or calibration map established from computational or laboratory testing of the tow vehicle 10. In various embodiments, the lookup table or calibration map correlates the frontal area of the towed vehicle 11 with a distance between the tow vehicle 10 and the towed vehicle 11, as well as the initial hitch load $N_i$. Next, at 608, the controller generates one or more control signals and transmits the control signals to the one or more actuators 104 to move the deflection member 102 from the stowed position to the initial deployed position based on the initial deflection angle A.

Next, at 610, the controller determines whether the first condition is still true, that is, that the towed vehicle 11 is still connected to the tow vehicle 10. If the first condition is true, the method 600 proceeds to 612.

At 612, the controller 22 begins an iterative evaluation of the hitch load or weight of the towed vehicle 11 measured at vehicle speed to determine whether a change in the deflection angle A provides improved aerodynamics and decreased drag. The controller 22, at 612, receives data indicating a small angle change X in the initial deflection angle A. Next, at 614, the controller receives data indicating a first hitch load $N_1$ measured when the deflection angle A of the deflection member 102 is increased by the small angle change X, that is, when the deflection member 102 is at a first adjusted deployment angle. At 616, the controller 22 receives data indicating a second hitch load $N_2$ measured when the deflection angle A of the deflection member 102 is decreased by the small change X, that is, when the deflection member is at a second adjusted deployment angle.

Next, at 618, the controller 22 compares the hitch loads $N_i$, $N_1$m and $N_2$ to determine an optimal deployment angle of the deflection member. Since the hitch load is one indication of the drag force applied to the tow vehicle 10, the controller compares the measured hitch loads to determine the minimum value. Continuing to 620, the controller generates one or more control signals and transmits the control signals to the one or more actuators 104 to move the deflection member 102 from the stowed position to an adjusted deployed position based on the initial deflection angle A, as modified by the small angle change X, if needed. The iterative loop continues for as long as the first condition is satisfied, that is, that the towed vehicle 11 is connected to the tow vehicle 10.

However, if the first condition is not true, that is, the towed vehicle 11 is disconnected from the tow vehicle 10, the method 600 proceeds from 610 to 622 and the controller generates one or more control signals and transmits the control signals to the one or more actuators 104 to move the deflection member 102 from the deployed position to the stowed position.

In various embodiments, the deployment angle A is based on the analysis of the sensor data received from one or more vehicle sensors, including the sensor 110, the sensor 120, and other vehicle sensors configured to measure vehicle speed, hitch load, etc., for example and without limitation. In some embodiments, the initial deployment angle A is determined from a lookup table or calibration map accessible to or stored within the controller 22. In some embodiments, the initial deployment angle A is based on physical or computational testing performed on the tow vehicle 10 and is based on characteristics of the tow vehicle 10 including, for example and without limitation, the vehicle type and configuration.

It should be emphasized that many variations and modifications may be made to the herein-described embodiments the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a" "an," and "the" include plural referents unless the context dearly dictates otherwise. Thus, for example, reference to an item includes reference to one or more items. The terms "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications. What is claimed is:

What is claimed is:

1. A method for controlling a vehicle, the method comprising:
   providing a first vehicle having a deflection system, a control system comprising a controller electronically connected to the deflection system, and a first tow connection, the deflection system comprising a movable deflection member and at least one actuator coupled to the deflection member;
   providing a second vehicle coupled to the first vehicle, the second vehicle having a second tow connection;
   providing at least one sensor coupled to the first vehicle and electronically connected to the control system, the at least one sensor configured to capture data corresponding to a frontal area of the second vehicle;
   monitoring, by the controller, sensor data received from the at least one sensor; and
   automatically generating, by the controller, a control signal to control the at least one actuator,
   wherein the at least one sensor comprises a first sensor configured to capture image data corresponding to the frontal area of the second vehicle and a second sensor configured to determine a distance between the first vehicle and the second vehicle, and the method further comprises determining, by the controller, an initial deployment angle of the deflection member and an initial hitch load based on the frontal area of the second vehicle and the distance between the first vehicle and the second vehicle.

2. The method of claim 1, wherein at least one actuator is configured to move the deflection member between a first position and a second position.

3. The method of claim 2, wherein the first position is a stowed position and the second position is a deployed position.

4. The method of claim 1, further comprising determining, by the controller, whether a first condition is satisfied, the first condition comprising detecting an electronic connection between the first tow connection and the second tow connection.

5. The method of claim 4, wherein if the first condition is satisfied, automatically generating the control signal to control the at least one actuator to move the deflection member between a first position and second position, wherein the first position is a stowed position and the second position is a deployed position.

6. The method of claim 1 further comprising determining, by the controller, a first adjusted deployment angle of the deflection member and a corresponding first hitch load and a second adjusted deployment angle of the deflection member and a corresponding second hitch load and comparing, by the controller, the initial hitch load, the first hitch load and the second hitch load to determine an optimal deployment angle of the deflection member.

7. An automotive vehicle, comprising:
a body having a roof, the roof including a recessed surface;
a deflection system including a movable deflection member coupled to the roof and movable from a first position adjacent to the recessed surface of the body and a second position, at least one actuator coupled to the deflection member, and at least one sensor, the at least one sensor configured to capture data on an environment surrounding the automotive vehicle; and
at least one controller in communication with the at least one actuator and the at least one sensor, the controller configured to, in response to satisfaction of a first condition, control the at least one actuator to move the deflection member between the first position and the second position,
wherein the controller is further configured to determine a deployment angle of the deflection member and automatically generate a control signal to control the at least one actuator to move the deflection member between a stowed position and a deployed position, wherein the deployed position is based on the deployment angle.

8. The automotive vehicle of claim 7, wherein the first position is a stowed position and the second position is a deployed position.

9. The automotive vehicle of claim 7, wherein the first condition is satisfied when the automotive vehicle is connected to a towed vehicle and, if the first condition is satisfied, the controller is further configured to automatically generate a control signal to control the at least one actuator to move the deflection member between the first position and the second position, wherein the first position is a stowed position and the second position is a deployed position.

10. The automotive vehicle of claim 9, wherein the controller is further configured to determine a frontal area of the towed vehicle.

11. The automotive vehicle of claim 10, wherein the at least one sensor comprises a first sensor configured to capture image data corresponding to the frontal area of the towed vehicle and a second sensor configured to determine a distance between the automotive vehicle and the towed vehicle, and the controller is further configured to determine an initial deployment angle of the deflection member and an initial hitch load based on the frontal area of the towed vehicle and the distance between the automotive vehicle and the towed vehicle.

12. The automotive vehicle of claim 11, wherein the controller is further configured to determine a first adjusted deployment angle of the deflection member and a corresponding first hitch load and a second adjusted deployment angle of the deflection member and a corresponding second hitch load and comparing, by the controller, the initial hitch load, the first hitch load and the second hitch load to determine an optimal deployment angle of the deflection member.

13. A system for controlling a first vehicle coupled to a towed vehicle, the system comprising:
a deflection system including a movable deflection member coupled to the first vehicle, at least one actuator coupled to the deflection member, a first sensor configured to capture image data corresponding to a frontal area of the towed vehicle and a second sensor configured to determine a distance between the first vehicle and the towed vehicle; and
a controller electronically connected to the at least one actuator and the at least one sensor, the controller configured to
monitor sensor data received from the first sensor and the second sensor;
determine an initial deployment angle of the deflection member and an initial hitch load based on the frontal area of the towed vehicle and the distance between the first vehicle and the towed vehicle; and
automatically generate a control signal to control the at least one actuator to move the deflection member between a first position and a second position.

14. The system of claim 13, wherein the first vehicle includes a roof including a recessed surface, the first position is a stowed position in which the deflection member is adjacent to the recessed surface, and the second position is a deployed position corresponding to the initial deployment angle.

15. The system of claim 13, wherein the controller is further configured to determine whether a first condition is satisfied, the first condition being satisfied when the first vehicle is connected to the towed vehicle, and if the first condition is satisfied, the controller is further configured to automatically generate the control signal to control the at least one actuator to move the deflection member between the first position and the second position, wherein the first position is a stowed position and the second position is a deployed position.

16. The system of claim 15, wherein the controller is further configured to determine a first adjusted deployment angle of the deflection member and a corresponding first hitch load and a second adjusted deployment angle of the deflection member and a corresponding second hitch load and compare the initial hitch load, the first hitch load and the second hitch load to determine an optimal deployment angle of the deflection member.

17. The system of claim 16, wherein the controller is further configured to automatically generate a first control signal to control the at least one actuator to move the deflection member to an initial deployed position based on the initial deployment angle, and automatically generate a second control signal to control the at least one actuator to move the deflection to an optimal deployed position based on the optimal deployment angle.

* * * * *